United States Patent Office 2,946,321
Patented July 26, 1960

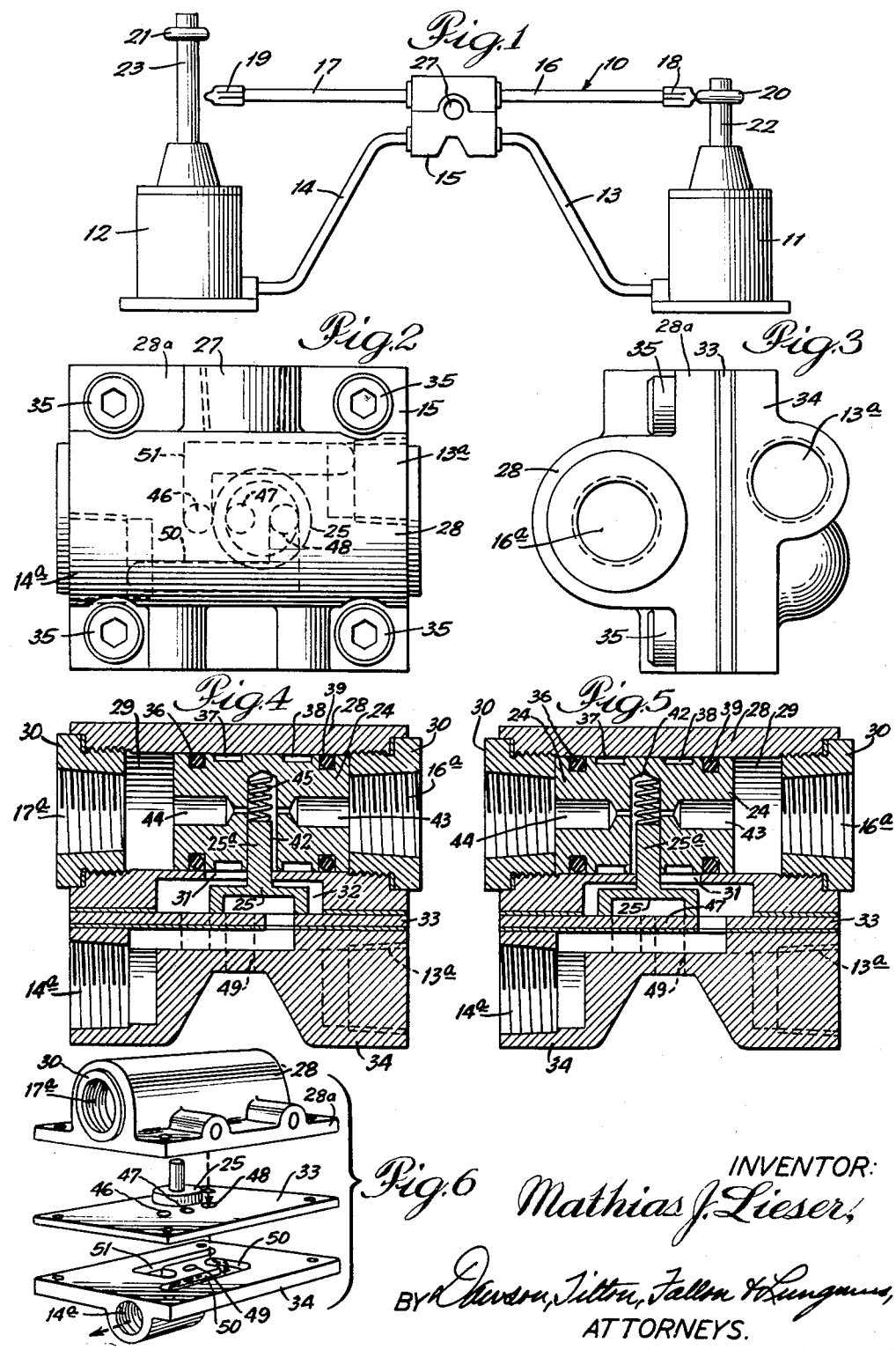

2,946,321

CONTROL SYSTEM FOR FLUID PRESSURE-ACTUATED RECIPROCATING DEVICE

Mathias J. Lieser, Chicago, Ill., assignor to Mead Specialties Company, Inc., Chicago, Ill., a corporation of Illinois Filed Nov. 21, 1957, Ser. No. 697,909

1 Claim. (Cl. 121—156)

This invention relates to a control system for a fluid pressure-actuated reciprocating device. It has particular utility for such reciprocating devices as air cylinders or rams, both of the single action or double action type.

The system with which this invention is concerned, in combination with the aforementioned device, provides a self-contained or self-actuated unit. In other words, the reciprocation of the device is provided automatically and without outside signal—merely utilizing the power derived from a pressurized fluid.

Although such arrangements have in general been known in the past, they have involved complex piping that has prevented their application to inexpensive and mass-produced structures. A simple, inexpensive but rugged unit for this purpose would, therefore, be desirable.

The problem outlined above becomes particularly aggravated when the unit and device must be contained in a restricted area, as is the case with many machines employing reciprocating devices in their operation, control, etc. The expedients of the prior art for providing self-actuation of a reciprocating device, therefore, become doubly condemned.

It is a general object of this invention to provide means for overcoming the problems set forth immediately above. Another general object is to provide a compact, relatively simple, control system for a fluid pressure-actuated reciprocating device. A still further object is to provide a control system for reversing the flow of pressurized fluid to a fluid pressure-actuated reciprocating device in which the device itself provides a signal for such reversal. Yet another object is to provide a novel fluid pressure supply and exhaust valve in such an environment. Yet another object is to provide a novel fluid pressure supply and exhaust valve equipped with a floating piston which provides pressurized fluid to the reciprocating device from a port at one end of the valve and at the same time vents from another port in the same end of the valve pressurized fluid from the chamber carrying the piston. Other objects and advantages of this invention can be seen as this specification proceeds.

This invention will be explained in conjunction with the accompanying drawings, in which—

Fig. 1 is an elevational view of the control system of the invention in an environmental setting; Fig. 2 is a top plan view of a fluid pressure supply and exhaust valve employed in the system of Fig. 1; Fig. 3 is an end view of the valve shown in Fig. 2; Fig. 4 is a longitudinal sectional view of the valve shown in Fig. 2; Fig. 5 is a view similar to Fig. 4 but showing certain movable parts in an alternative position; and Fig. 6 is a perspective exploded view of the structure shown in Figs. 2–5.

In the illustration given, the numeral 10 designates generally a control system embodying teachings of this invention for use with a fluid pressure-actuated reciprocating device. For ease of understanding, the system is shown in conjunction with two such devices which are shown as air rams 11 and 12. Conduits for conducting a pressurized fluid such as compressed air to these rams is designated by the numerals 13 and 14 which enter the bottom portions of rams 11 and 12 and at the other ends of conduits 13 and 14 communicate with a fluid pressure supply and exhaust valve 15.

Valve 15 is provided with a second pair of conduits 16 and 17 which terminate in poppet type exhaust valves 18 and 19, respectively. The poppet valves 18 and 19 are actuated by flanges or collars 20 and 21, respectively, on ramrods 22 and 23, respectively.

Valve 15 is of the piston-actuated, slide valve type, as can best be appreciated from a consideration of Figs. 4 and 5. In those figures, the numeral 24 designates a floating piston which carries a slide valve 25. Piston 24 is reciprocated by alternately releasing pressure from the ends thereof, which in turn positions slide valve 25 so as to communicate alternately supply passages in valve 15 that lead to conduits 13 and 14.

It is believed that a brief description of the operation of the system and rams of Fig. 1 will be helpful in understanding the invention.

*Operation*

In the condition illustrated, the piston within valve 15 is moving to the right, since the actuation of poppet valve 18 by flange 20 has released air from the right side of the piston. Poppet valve 19, being closed, maintains fluid pressure on the left side of the piston so as to set up a pressure differential responsible for the movement to the right of the piston. The movement of the piston shifts the slide valve so as to direct compressed air through conduit 13 rather than through conduit 14, with the result that the ram or piston within air ram 11 will be moved upwardly. During this time, the ram or piston in air ram 12 will be moved downwardly under the influence of an internal spring. The retraction of ramrod 23 will ultimately actuate poppet valve 19, after which time the internal piston will move to the left to permit a pressurized fluid to now be directed through conduit 14. A single pressurized fluid connection is all that is required for valve 15, the inlet being designated by the numeral 27. Whenever pressurized fluid entering valve 15 through inlet 27 is communicated with a given conduit 13 or 14, the un-communicated conduit is communicated with an exhaust port, thereby allowing the air ram spring to function unopposed to return the ram to a bottom position.

A valve which has been found very satisfactory for achieving the self-actuation of such an arrangement is set forth in Figs. 2–6 and will now be described in detail. The numeral 28, seen in Figs. 3–6, designates a cylinder providing a body portion or casing, the internal cylinder being designated by the numeral 29. The open end portions of body 28 are closed by threaded plugs 30, which are adapted to receive conduits 16 and 17, as seen in Fig. 1. Reciprocably mounted within cylinder 29 is piston 24, which is of the floating type, i.e., it is not equipped with a piston rod. A pressurized fluid entrance port 27 is provided in the side wall of body 28 and communicates with cylinder 29. Inlet port 27 is disposed approximately midway along the length of cylinder 29.

Along one side, body 28 is provided with an integral, outwardly-extending flange portion 28a, best seen in Fig. 6. The side wall of cylinder 29 adjacent flanged portion 28a is equipped with a longitudinally-extending slot 31. Mounted within piston 24 and extending to slot 31 into a chamber 32 provided in body 28 adjacent flange 28a is slide valve 25. Slot 31 is approximately the length of piston travel in cylinder 29, as can be appreciated from a consideration of Figs. 4 and 5. Underlying the bottom face of flange 30 and partially covering chamber 32, is a cover plate 33. Underlying cover 33 is a second casing 34 which is equipped with ports for union with conduits 13 and 14. The three principal structural elements making up the valve, body 28, cover plate 33, and casing 34, are secured together by means of bolts 35, seen in Fig. 2 and which have been removed in order to illustrate the valve in exploded form in Fig. 6.

Piston 24 is provided with four spaced annular recesses 36–39, which are designated, for the sake of clarity, only in Fig. 4. Annular recesses 36 and 39 receive O-ring seals 40 and 41, respectively, and serve to isolate and seal one end of the piston 24 from the other. Intermediate recesses 36 and 39 are recesses 37 and 38, which serve to communicate pressurized fluid from inlet 27 to chamber 32.

As seen in Figs. 4 and 5, slide valve 25 is loosely mounted in a laterally-extending bore 42 in piston 24. Piston 24 is also equipped with a pair of longitudinally-extending bores 43 and 44, which communicate with plugs 30 on the right and left-hand sides of valves 15, respectively.

Bores 43 and 44 are constricted at their juncture with lateral bore 42 so as to limit the flow of pressurized fluid from chamber 32 through the longitudinal bores into the end portions of cylinder 29. The stem portion 25a of slide valve 25 which is received within bore 42 extends only partway thereinto, the remaining portion of bore 42 being occupied by a coil spring 45 which urges slide valve 25 into sealing relationship with cover plate 33.

Cover plate 33 is equipped with three spaced, longitudinally-aligned openings 46, 47 and 48. Slide valve 25 is cup-shaped and so proportioned in relationship to the spacing and size of openings 46—48 that it will cover and thereby communicate the central opening 47 with one end opening in one extreme position of piston 24 and with the other end opening during the other extreme portion of piston 24.

Casing 34 is provided with a central opening 49 which is aligned with opening 47 in cover 33 and which serves as an exhaust port to the atmosphere. Casing 34 is also provided with a pair of interadjacent, L-shaped grooves 50 and 51 which at their inner or interjacent ends are aligned with openings 48 and 46, respectively. The other ends of grooves 50 and 51 are connected with ports in the opposite ends of casing 34, which ports receive conduits 13 and 14. The provision of oppositely-extending, interpositioned, L-shaped grooves or channels 50 and 51 make possible the operation outlined above, wherein pressurized fluid was directed to conduit 13 when pressurized fluid was exhausted from conduit 16. Thus, an economical and positive-acting system is provided, since pressurized fluid is being vented from two ports on one side of a valve body.

When valve 15 is in the condition shown in Fig. 4, pressurized fluid from inlet 27 is being directed to port 13a which is the outlet of L-shaped groove 51. Slide valve 25 interconnects exhaust port 47 with L-shaped groove 50 and thus port 14a. In Fig. 5, where piston 24 has been shifted to its left extreme position, slide valve 25 interconnects exhaust port 47 with port 13a through L-shaped channel 51, while L-shaped channel 50 interconnects chamber 32, which contains pressurized fluid, with port 14a.

To bring about the shift of piston 24 from the condition shown in Fig. 4 to that shown in Fig. 5, pressurized fluid is vented at the left port of cylinder 29, the port being designated 17a, and venting through conduit 17 and poppet valve 19. Such venting brings about a shift of piston 24 to the left and the communication of pressurized fluid from inlet 27 with the left-hand supply port 14a. Movement from the condition of piston 24 shown in Fig. 5 to that of Fig. 4 is achieved by venting pressurized fluid from the right-hand side of chamber 29 through the port designated 16a and which communicates with conduit 16 and exhaust valve 18.

It is to be appreciated that because of bores 44 and 43, pressurized fluid from inlet 27 can find its way on both sides of piston 24. The constricted portions in these bores, however, prevents the rapid build-up in pressure on the side of piston 24 which has just been vented to bring about an alternation in the operation of the reciprocating device with which valve 15 is used.

While in the foregoing specification an embodiment of the invention has been set forth in considerable detail for purposes of describing the invention, it will be apparent to those skilled in the art that numerous changes may be made without departing from the spirit and principles of the invention.

I claim:

In a control system for a fluid pressure-actuated device, a fluid pressure supply and exhaust valve comprising a generally cylindrically shaped body equipped with a cylindrical end chamber and having end exhaust ports and an intermediate supply port, exhaust valves communicating with said end exhaust ports adapted to be actuated by the reciprocation of said device, an elongated slot in the wall of said cylinder aligned with the length thereof, said body having a flat outer side portion about said slot, a piston reciprocably mounted in said cylinder and equipped with a laterally-extending slide valve extending out of said slot, means on said piston urging said slide valve outwardly of said slot, said piston being equipped with passage means for pressurized fluid entering said cylinder through said supply port to communicate said fluid with said exhaust ports and said slot, a generally rectangular cover for said slot secured to said flat outer side portion of said cylinder and providing a bearing surface for said slide valve, said cover having three openings therein aligned in the direction of travel of said slide valve, the center of said three openings being positioned at the center of said cover, said slide valve being equipped with a recessed end bearing against said cover and adapted to communicate said center opening with one end opening in one extreme position of said slide valve and said center opening with the other end opening at the other extreme position of said slide valve, and a casing secured to said cover and equipped with a port at each end thereof aligned with said end exhaust ports, said casing ports being adapted to be communicated with said device for reciprocating the same, said casing having a flat outer side adjacent said cover, three passages in said casing communicating with said casing flat outer side and arranged to communicate with said three openings, one passage extending transversely away from said casing flat outer side and adapted to communicate with said center opening, the other passages comprising L-shaped depressions in said casing flat outer side, each L-shaped depression connecting an end opening in said cover, with the end port in said casing remote therefrom.

References Cited in the file of this patent
UNITED STATES PATENTS

| | | |
|---|---|---|
| 1,165,157 | Dreehouse | Dec. 21, 1915 |
| 1,791,613 | Clay | Feb. 10, 1931 |
| 2,601,531 | Kimmell | June 24, 1952 |
| 2,607,197 | Johnson | Aug. 19, 1952 |
| 2,729,242 | Olson | Jan. 3, 1956 |